United States Patent
Maikawa

(10) Patent No.: US 9,537,323 B2
(45) Date of Patent: Jan. 3, 2017

(54) CONTACTLESS POWER SUPPLYING SYSTEM WITH POWER LIMITING CONTROL

(71) Applicant: NISSAN MOTOR CO., LTD., Yokohama-shi, Kanagawa (JP)

(72) Inventor: Kengo Maikawa, Kawasaki (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/784,231

(22) PCT Filed: Mar. 20, 2014

(86) PCT No.: PCT/JP2014/057665
§ 371 (c)(1),
(2) Date: Oct. 13, 2015

(87) PCT Pub. No.: WO2014/171255
PCT Pub. Date: Oct. 23, 2014

(65) Prior Publication Data
US 2016/0049798 A1     Feb. 18, 2016

(30) Foreign Application Priority Data

Apr. 15, 2013  (JP) ................................. 2013-084549

(51) Int. Cl.
*B60L 11/18* (2006.01)
*H02J 5/00* (2016.01)

(52) U.S. Cl.
CPC .............. *H02J 5/005* (2013.01); *B60L 11/182* (2013.01); *B60L 11/1825* (2013.01);
(Continued)

(58) Field of Classification Search
CPC .............. H02J 5/005; H02J 7/00; H02J 17/00; B60L 11/1825; B60L 11/182; B60L 11/1829; B60L 11/1833; Y02T 10/7072; Y02T 90/121; Y02T 90/14; Y02T 90/128; Y02T 90/122; Y02T 10/7005; Y02T 90/125; Y02T 90/127; Y02T 10/7241
(Continued)

(56) References Cited

U.S. PATENT DOCUMENTS 9,184,633 B2 * 11/2015 Obayashi .............. B60L 11/123
9,315,110 B2    4/2016 Asselin
(Continued)

FOREIGN PATENT DOCUMENTS

| DE | 10 2010 054 472 A1 | 6/2012 |
|---|---|---|
| JP | 2004-327763 A | 11/2004 |
| JP | 2008-263779 A | 10/2008 |
| JP | 2012-005238 A | 1/2012 |

*Primary Examiner* — Jared Fureman
*Assistant Examiner* — Michael Warmflash
(74) *Attorney, Agent, or Firm* — Foley & Lardner LLP

(57) ABSTRACT

Provided is a contactless power supplying system which is efficient and can be built of small coils by appropriately limiting power to be inputted into a transmitting coil. In the contactless power supplying system, power transmitted from a transmitting coil is received by a receiving coil by means of magnetic coupling, and the contactless power supplying system includes a power control unit configured to cause power from a power source to flow through the transmitting coil and a control unit configured to perform power limiting control of limiting the power flowing through the transmitting coil by controlling the power control unit.

7 Claims, 9 Drawing Sheets

(52) U.S. Cl.
CPC ....... *B60L 11/1829* (2013.01); *B60L 11/1833* (2013.01); *H02J 50/10* (2016.02); *H02J 50/80* (2016.02); *B60L 2210/30* (2013.01); *B60L 2210/40* (2013.01); *Y02T 10/7005* (2013.01); *Y02T 10/7072* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01)

(58) Field of Classification Search
USPC .......................................................... 307/104
See application file for complete search history.

(56) References Cited

U.S. PATENT DOCUMENTS

| | | | | |
|---|---|---|---|---|
| 2008/0182531 | A1* | 7/2008 | Lagnado | H04W 52/52 455/127.1 |
| 2011/0304220 | A1* | 12/2011 | Whitehead | H01F 21/08 307/104 |
| 2013/0169062 | A1* | 7/2013 | Maikawa | H01F 38/14 307/104 |
| 2014/0103871 | A1* | 4/2014 | Maikawa | H02J 7/025 320/108 |
| 2014/0292263 | A1 | 10/2014 | Asselin | |
| 2014/0306545 | A1* | 10/2014 | Robertson | H02J 5/005 307/104 |
| 2015/0288195 | A1* | 10/2015 | Ashery | H02J 5/005 307/104 |

* cited by examiner

FIG. 10
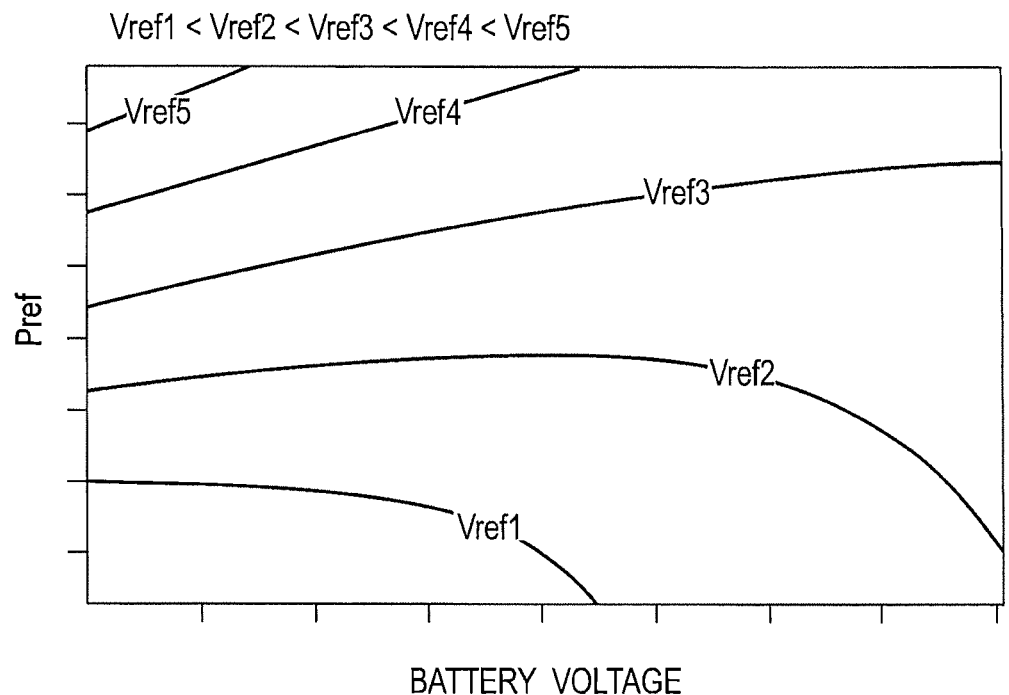
(a)
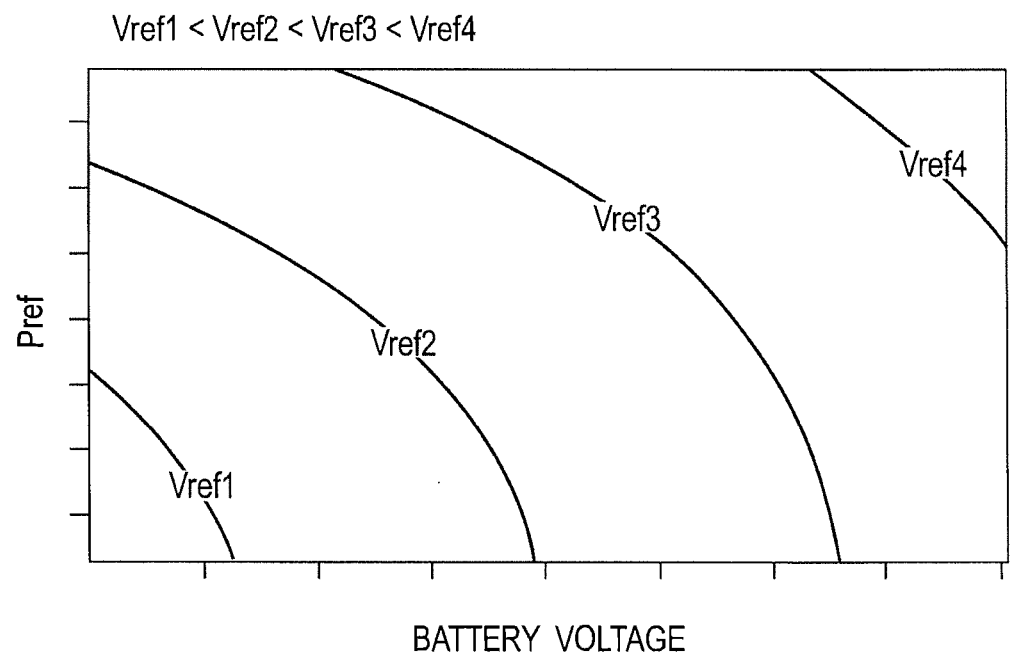
(b)

CONTACTLESS POWER SUPPLYING SYSTEM WITH POWER LIMITING CONTROL

TECHNICAL FIELD

The present invention relates to a contactless power supplying system.

BACKGROUND ART

As a power supplying system, a contactless power supplying system which contactlessly supplies power by means of magnetic coupling of paired coils has been conventionally known. The contactless power supplying system is applied more and more to electric vehicles such as electric cars, for example. In the contactless power supplying system, one of the coils, which is connected to an AC power source, is installed in a parking space of a charging station or the like, and the other coil, which is connected to a load (for example, a battery), is installed in an electric vehicle. By using the coil on the parking space side as a transmitting coil (primary coil) and using the coil on the electric vehicle side as a receiving coil (secondary coil), power can be supplied from the AC power source on the parking space side to the battery which is the load on the vehicle side by means of magnetic coupling of the paired coils.

For example, Patent Literature 1 discloses a contactless power transmitting apparatus. This apparatus includes a power transmitting device, a transformer, a power receiving device, and a control device. The transmitting device generates an AC signal of a predetermined frequency which is to be transmitted, and the transformer efficiently transfers power generated in the power transmitting device to the power receiving device side. The control device reduces an oscillation frequency of an oscillation circuit in the power transmitting device to a predetermined value when no load or a small load is connected to the power receiving device. This can reduce the output voltage of the power receiving device and prevent negative effects due to abnormality of the load.

CITATION LIST

Patent Literature

Patent Literature 1: Japanese Patent Application Publication No. 2008-263779

SUMMARY OF INVENTION

When modes of use of the contactless power supplying system in an electric vehicle are considered, it is assumed that the power supplying is performed with various receiving coils of different specifications, and the transmitting coil is misaligned with the receiving coil due to skills of the driver and the like. A resonance condition thus varies depending on a coil coupling condition between the transmitting coil and the receiving coil, and the voltage of the transmitting coil becomes high in some cases depending on a voltage condition of the load. Designing the transmitting coil in view of the maximum possible voltage that would be applied to the transmitting coil leads to an increase in size of the coil, and requirements for size reduction cannot be satisfied. Moreover, although the voltage of the transmitting coil can be prevented from becoming high by limiting the power, the efficiency of the system may decrease when the power is limited more than necessary.

The present invention has been made in view of the circumstances described above, and an object thereof is to provide a contactless power supplying system which is efficient and can be built of small coils by appropriately limiting power to be inputted into a transmitting coil.

Solution to Problem

A contactless power supplying system according to a first aspect of the present invention comprises: a transmitting coil configured to transmit power; a power control unit configured to cause power from a power source to flow through the transmitting coil; a receiving coil configured to receive the power transmitted from the transmitting coil by means of magnetic coupling; a load to which power outputted from the receiving coil is inputted; and a control unit configured to perform power limiting control of limiting the power flowing through the transmitting coil by controlling the power control unit, wherein the control unit determines a magnitude relationship between an induced current and a receiving coil current based on a coil coupling condition between the transmitting coil and the receiving coil, and selects a control mode to be employed for the power limiting control based on a result of the determination.

Parts (a) and (b) of FIG. 10 are explanatory views schematically illustrating power command maps for determining the limited power command with the battery voltage and the transmitting coil voltage being parameters.

DESCRIPTION OF EMBODIMENTS

[First Embodiment]

Figure 1:
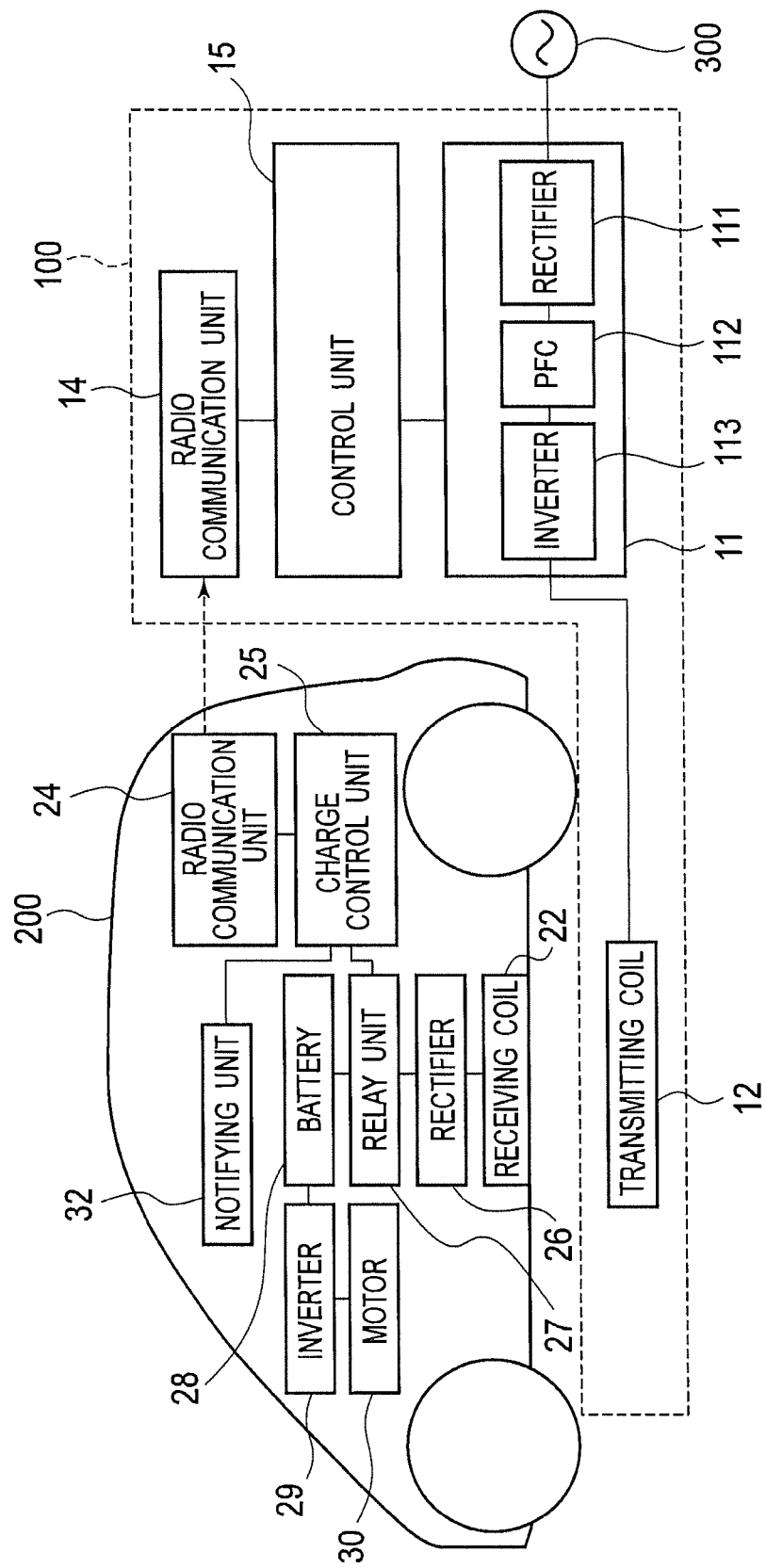
FIG. 1 is a block diagram schematically illustrating a configuration of a contactless power supplying system.
Figure 2:
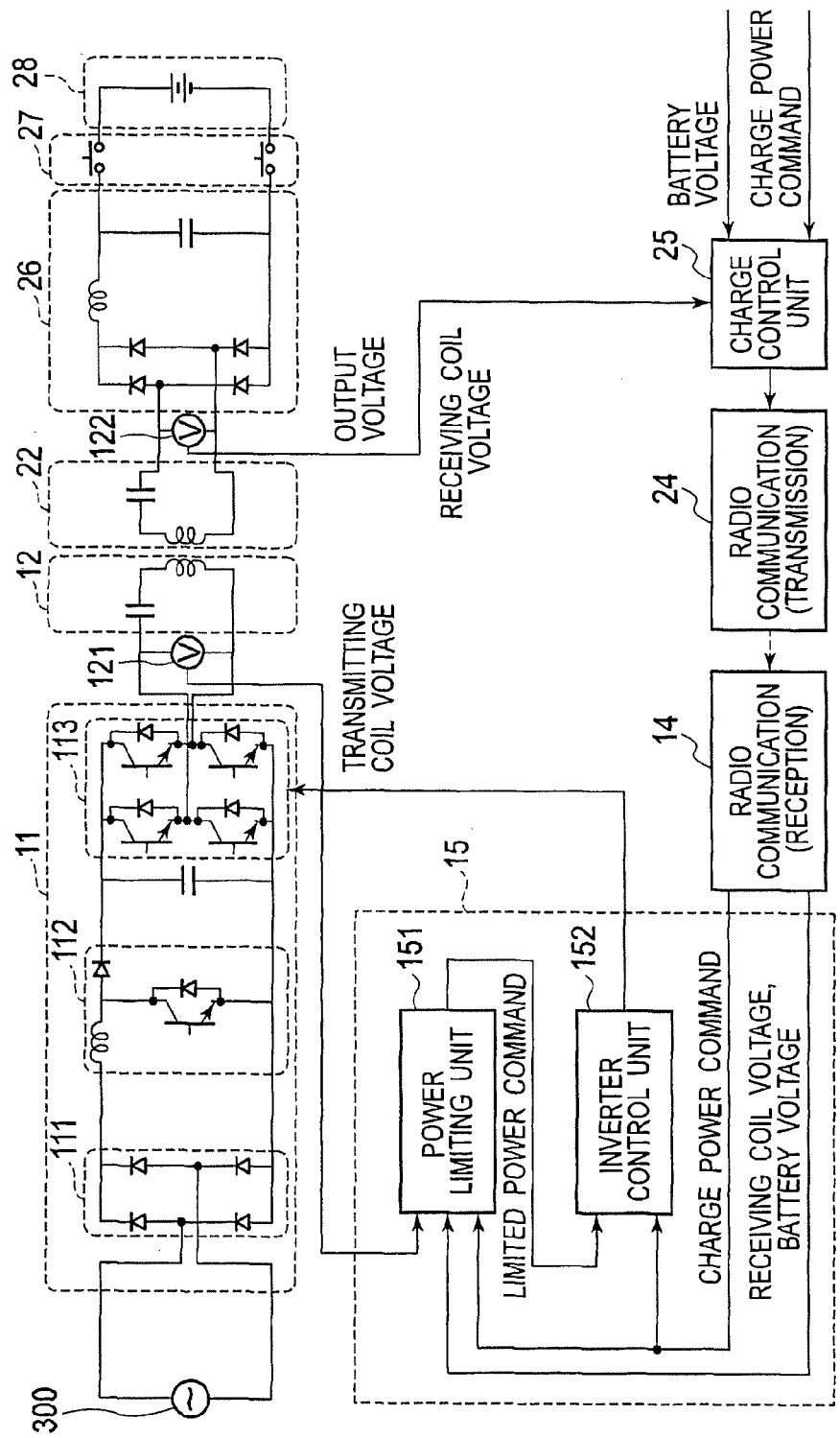
FIG. 2 is an explanatory view schematically illustrating a circuit configuration of the contactless power supplying system and a configuration of a control system of the contactless power supplying system.

FIG. 1 is a block diagram schematically illustrating a configuration of a contactless power supplying system in a first embodiment. FIG. 2 is an explanatory view schematically illustrating a circuit configuration of the contactless power supplying system and a configuration of a control system of the contactless power supplying system. The contactless power supplying system includes a power supplying device 100 which is a ground-side unit and an electric vehicle (hereafter, simply referred to as "vehicle") 200 which includes a vehicle-side unit, and is a system which contactlessly supplies electrical power from the power supplying device 100 to charge a battery 28 provided in the vehicle 200.

The power supplying device 100 is installed in a charging station including a parking space for the vehicle 200, and supplies power to the vehicle 200. A power control unit 11, a transmitting coil 12, a radio communication unit 14, and a control unit 15 mainly constitute the power supplying device 100.

The power control unit 11 has a function of converting AC power transmitted from an AC power source 300 to high-frequency AC power and transmitting the high-frequency AC power to the transmitting coil 12. The power control unit 11 includes a rectifier 111, a PFC (Power Factor Correction) circuit 112, and an inverter 113.

The rectifier 111 is electrically connected to the AC power source 300 and rectifies the AC power outputted from the AC power source.

The PFC circuit 112 is connected between the rectifier 111 and the inverter 113. The PFC circuit 112 includes, for example, a step-up chopper circuit and the like, and is a circuit which shapes a waveform of a current outputted from the rectifier 111 to improve a power factor. The output of the PFC circuit 112 is smoothed by a smoothing capacitor.

The inverter 113 is a power converting device including a smoothing capacitor, a switching element such as an IGBT, and the like. The inverter 113 converts a DC current into a high-frequency AC current and supplies the AC current to the transmitting coil 12, based on drive signals from the control unit 15. For example, the inverter 113 generates PWM pulses from a DC voltage by means of PWM control and thereby applies an AC voltage to the transmitting coil 12.

The transmitting coil 12 is a primary coil for contactlessly transmitting power to a receiving coil 22 on the vehicle 200 side. Although the transmitting coil 12 is formed by connecting a coil and a resonant capacitor in series, the coil and the resonant capacitor may be connected in parallel, series-parallel, or the like. The transmitting coil 12 is provided in a target portion such as a parking space for parking the vehicle 200. When the vehicle 200 is parked at a specified position in the parking space, the transmitting coil 12 faces a lower side of the receiving coil 22 on the vehicle 200 side.

The radio communication unit 14 performs bidirectional communication with a radio communication unit 24 provided on the vehicle 200 side. The communication frequency used between the radio communication unit 14 and the radio communication unit 24 is set to a frequency higher than a frequency used in vehicle accessories such as an intelligence key. Accordingly, when the communication between the radio communication unit 14 and the radio communication unit 24 is performed, this communication is less likely to interfere with the vehicle accessories. The communication between the radio communication unit 14 and the radio communication unit 24 uses, for example, various wireless LAN methods and uses communication methods suitable for long-range communication.

The control unit 15 has a function of controlling the power supplying device 100. A microcomputer formed mainly of a CPU, a ROM, a RAM, and an I/O interface, can be used as the control unit 15. The control unit 15 controls the power control unit 11, the transmitting coil 12, and the radio communication unit 14. Specifically, the control unit 15 transmits, to the vehicle 200 side, a control signal of starting the power supply and receives, from the vehicle 200 side, a control signal of requesting the reception of power, by means of communication between the radio communication unit 14 and the radio communication unit 24. The control unit 15 performs switching control of the inverter 113 and controls the power supplied from the transmitting coil 12.

Next, the vehicle 200 includes the receiving coil 22, the radio communication unit 24, a charge control unit 25, a rectifier 26, a relay unit 27, the battery 28, an inverter 29, a motor 30, and a notifying unit 32.

The receiving coil 22 is a secondary coil for contactlessly receiving power from the transmitting coil 12 on the power supplying device 100 side. Although the receiving coil 22 is formed by connecting a coil and a resonant capacitor in series, the coil and the resonant capacitor may be connected in parallel, series parallel, or the like. The receiving coil 22 is provided in a target portion such as a bottom surface (chassis) of the vehicle 200. When the vehicle 200 is parked at a specified position in the parking space, the receiving coil 22 faces an upper side of the transmitting coil 12 on the power supplying device 100 side.

The radio communication unit 24 performs bidirectional communication with the radio communication unit 14 provided on the power supplying device 100 side.

The rectifier 26 is connected to the receiving coil 22, and is formed mainly of a rectifying circuit configured to rectify the AC power received by the receiving coil 22 to DC power. The rectifier 26 converts the output from the receiving coil 22 into the DC power by rectifying the output and subjecting the output to filtering processing using a filtering circuit, and outputs the DC power.

The relay unit 27 includes a relay switch which is turned on and off by the control of the charge control unit 25. The relay unit 27 can disconnect a circuit including the battery 28 and a circuit including the receiving coil 22 and the rectifier 26 from each other by turning off the relay switch.

The battery 28 is a power source of the vehicle 200, and is formed by, for example, electrically connecting multiple secondary cells.

The inverter 29 is a power converting device including a switching element such as an IGBT, a PWM control circuit, and the like. The inverter 29 converts DC power outputted from the battery 28 to AC power and supplies the AC power to the motor 30. The motor 30 is formed of, for example, a three-phase AC electric motor and is a drive source for driving the vehicle 200.

The notifying unit 32 is formed of a warning lamp, a display of a navigation system, a speaker, or the like, and is disposed in an instrument panel or the like in a vehicle cabin. The notifying unit 32 outputs light, an image, a sound, or the like for a user based on the control by the charge control unit 25.

The charge control unit 25 has a function of controlling the charging of the battery 28. A microcomputer formed mainly of a CPU, a ROM, a RAM, and an I/O interface can be used as the charge control unit 25. For example, the charge control unit 25 receives, from the power supplying device 100 side, the control signal of starting the power supply and transmits, to the power supplying device 100 side, the control signal of requesting the reception of power, by means of communication between the radio communication unit 24 and the radio communication unit 14.

Moreover, although omitted in the drawings, the charge control unit 25 is connected to a controller configured to control the entire vehicle 200 via a CAN communication network. The controller performs switching control of the inverter 29, obtains the voltage of the battery 28 (hereafter, referred to as "battery voltage") from a battery controller managing the battery 28, and calculates a charge power command based on a remaining charge power amount. The charge control unit 25 can obtain the battery voltage and the charge power command from the controller.

In the contactless power supplying system of the embodiment, the power supplying is performed in a contactless state by means of electromagnetic induction between the transmitting coil 12 and the receiving coil 22. Specifically, when a voltage is applied to the transmitting coil 12, magnetic coupling occurs between the transmitting coil 12 and the receiving coil 22 which is the receiving coil, and power is supplied from the transmitting coil 12 to the receiving coil 22.

Figure 3:
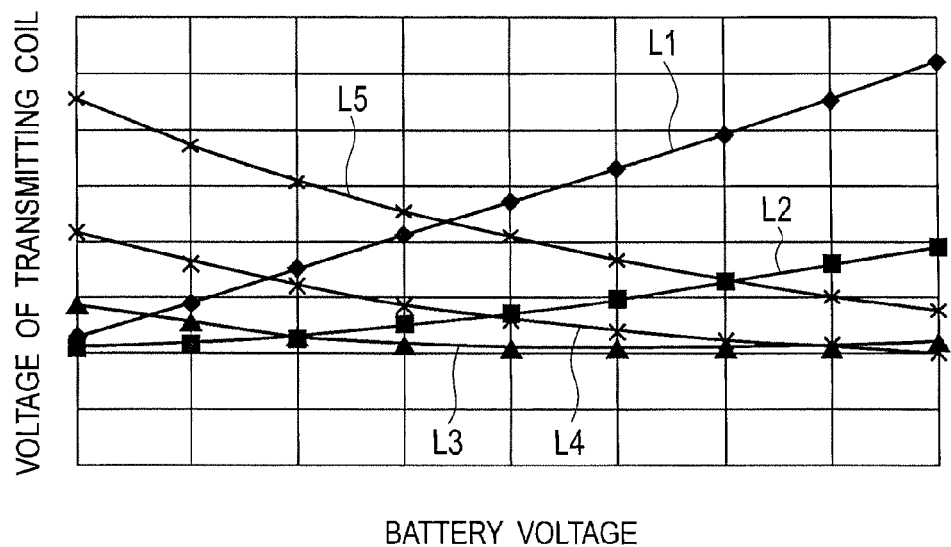
FIG. 3 is an explanatory view illustrating relationships between a coil voltage (vertical axis) and a battery voltage (horizontal axis).

Before specifically describing the power supply control by the contactless power supplying system, the concept of the power supply control is described. FIG. 3 is an explanatory view illustrating relationships between the voltage (vertical axis) of the transmitting coil 12 and the battery voltage (horizontal axis). In FIG. 3, L1 to L5 show tendencies of the voltages depending on the differences in a coil coupling condition. Here, the coil coupling condition refers to a degree of coupling between the transmitting coil 12 and the receiving coil 22 and is a parameter which is determined depending on specifications of both coils and a relative positional relationship between the transmitting coil 12 and the receiving coil 22 in the power supplying. Regarding L1 to L5, the greater the number attached to the letter L is, the higher the coupling condition is.

It is found that a transmitting coil voltage indicating the voltage of the transmitting coil 12 changes depending on the battery voltage, and the tendencies of the relationship between the transmitting coil voltage and the battery voltage vary depending on the coil coupling condition. Specifically, when the coupling condition is low (for example, L1 and L2), both voltages have a positive correlation in which the coil voltage increases with an increase of the battery voltage. Meanwhile, when the coupling condition is high (for example, L3, L4, and L5), both voltages have a negative correlation in which the coil voltage decreases with an increase of the battery voltage.

Figure 4:
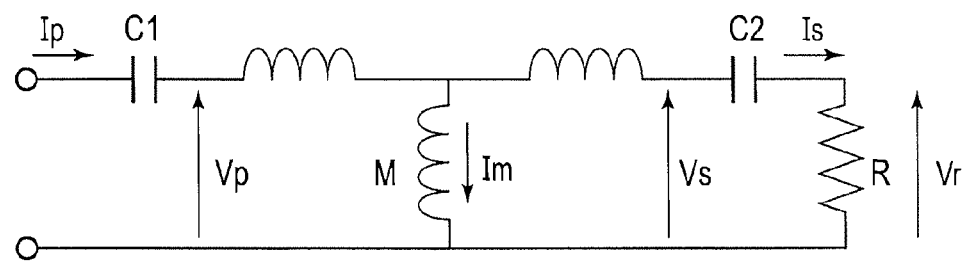
FIG. 4 is an equivalent circuit schematically illustrating a configuration of a contactless power supplying system.

FIG. 4 is an equivalent circuit schematically illustrating a configuration of the contactless power supplying system in the embodiment. In FIG. 4, reference sign Ip denotes a transmitting coil current, Vp denotes the transmitting coil voltage, and C1 denotes a static capacitance of the capacitor on the transmitting coil 12 side. Moreover, reference sign M denotes a mutual inductance and Im denotes an induced current. Furthermore, reference sign Vs denotes a receiving coil voltage and Is denotes a receiving coil current. Moreover, reference sign C2 denotes a static capacitance of the capacitor on the receiving coil 22 side, R denotes a load resistance, and Vr denotes a load voltage.

The coil voltage characteristics of the transmitting coil 12 are determined by a ratio between the receiving coil current Is and the induced current Im. The receiving coil current Is and the induced current Im are expressed by the following formulae, where the power supplied to the receiving coil 22 is P and an angular frequency is ω.

[Math 1]

$$Is = \frac{P}{Vr} \qquad (1)$$

[Math 2]

$$Im \cong \frac{Vr}{\omega M} \qquad (2)$$

There is a case where the receiving coil current Is decreases with an increase of the battery voltage Vr when the control is performed with the power being constant. This means that the receiving coil current Is is dominant in the change of the battery voltage Vr, and the situation where the coil coupling condition is high corresponds to this case. In this case, the receiving coil current Is tends to be greater than induced current Im, and the transmitting coil voltage Vp has a negative correlation with an increase of the battery voltage Vr which is the load voltage, i.e. the transmitting coil voltage Vp may tend to decrease.

Meanwhile, there is a case where the induced current Im increases with an increase of the battery voltage Vr when the control is performed with the power being constant. This means that the induced current Im is dominant in the change of the battery voltage Vr, and the situation where the coil coupling condition is low corresponds to this case. In this case, the induced current Im tends to be greater than the receiving coil current Is, and the transmitting coil voltage Vp has a positive correlation with an increase of the battery voltage Vr, i.e. the transmitting coil voltage Vp may tend to increase.

In view of these relationships, the following operations need to be performed in order to limit the transmitting coil voltage Vp within a range of an upper limit voltage specified for the transmitting coil 12 (hereafter, referred to as "coil upper limit voltage") to achieve size reduction of the coil. In the former case, the power to be inputted into the transmitting coil 12 needs to be limited in the situation where the battery voltage is low. Meanwhile, in the latter case, the power to be inputted into the transmitting coil 12 needs to be limited in the situation where the battery voltage is high. Based on such a control concept, the control unit 15 of the power supplying device 100 performs power limiting control of limiting the power to be inputted into the transmitting coil 12, such that the transmitting coil voltage Vp is limited to a range lower than the coil upper limit voltage, by controlling the power control unit 11 (specifically, the inverter 113).

Referring again to FIG. 2, the charge control unit 25 on the vehicle 200 side obtains the charge power command outputted from the controller (not illustrate) and the battery voltage Vr obtained by the controller. Moreover, the charge control unit 25 obtains the receiving coil voltage Vs which is the voltage of the receiving coil 22 from a voltage sensor 221. Then, the charge control unit 25 converts the charge power command, the battery voltage, and the receiving coil voltage Vs to data for radio communication. The converted data is transmitted by the radio communication unit 24 on the vehicle 200 side to be received by the radio communication unit 14 on the power supplying device 100 side, and is outputted to the control unit 15 on the power supplying device 100 side.

When the control unit 15 is viewed in terms of function in relation to the embodiment, the control unit 15 has a power limiting unit 151 and an inverter control unit 152.

The power limiting unit 151 receives the transmitting coil voltage Vp which is detected by a voltage sensor 121 in addition to the receiving coil voltage Vs, the battery voltage Vr, and the charge power command which are transmitted from the vehicle 200 side. The power limiting unit 151 determines a magnitude relationship between the induced current Im and the receiving coil current Is, based on the coil coupling condition, and selects a control mode to be employed for the power limiting control, based on the determination result. When the induced current Im is greater than the receiving coil current Is, the transmitting coil voltage Vp has the positive correlation, and the power limiting unit 151 thus selects a control mode in which the power is limited in the situation where the battery voltage Vr is high. Meanwhile, when the receiving coil current Is is greater than (or equal to) the induced current Im, the transmitting coil voltage Vp has the negative correlation, and the power limiting unit 151 thus selects a control mode in which the power is limited in the situation where the battery voltage Vr is low. Then, the power limiting unit 151 determines a power command (hereafter, referred to as "limited power command") which is within a range satisfying the coil upper limit voltage, in accordance with the selected control mode. The limited power command is outputted to the inverter control unit 152.

The inverter control unit 152 receives the charge power command requested by the vehicle 200. Moreover, the inverter control unit 152 receives the limited power command determined by the power limiting unit 151. The inverter control unit 152 calculates a driving frequency of the inverter 113 and a duty of the inverter 113 based on such received information and generates a drive signal for controlling the inverter 113 based on the calculation result. The inverter control unit 152 thereby controls the power to be inputted into the transmitting coil 12 with the limited power command, determined by the power limiting unit 151, being the upper limit.

Figure 5:
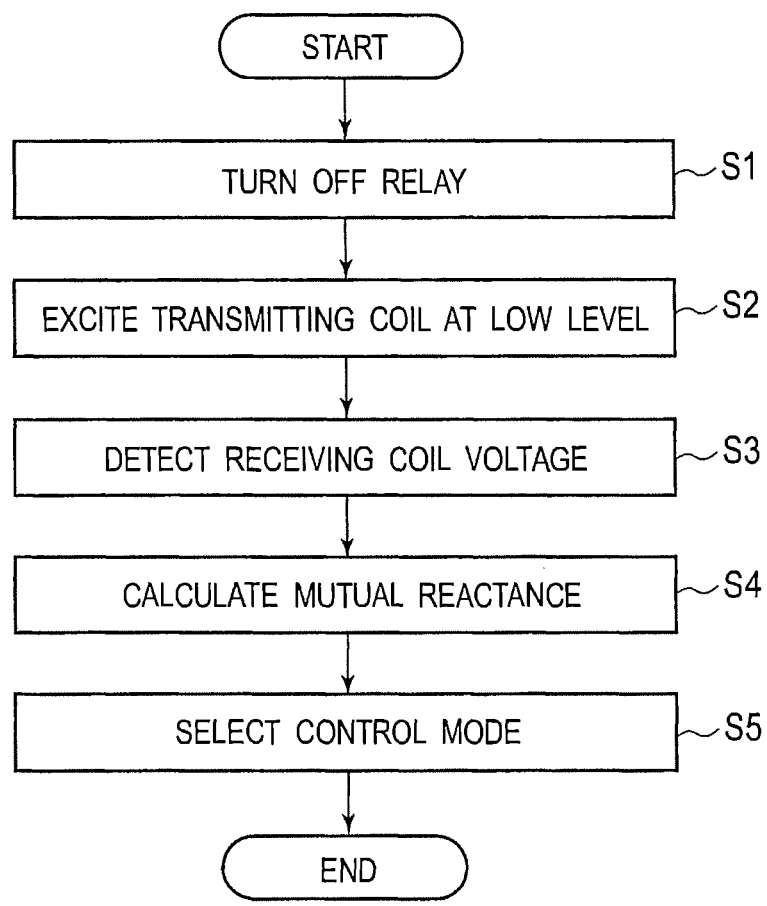
FIG. 5 is a flowchart illustrating detailed procedures of power limiting control.

FIG. 5 is a flowchart illustrating detailed procedures of the power limiting control in the embodiment. The processing illustrated in this flowchart is executed by the control unit 15 on the power supplying device 100 side, specifically the power limiting unit 151. When executing this processing, the control unit 15 on the power supplying device 100 side can obtain required information from the charge control unit 25 on the vehicle 200 side.

First, in step S1, the power limiting unit 151 outputs a control signal of turning off the relay unit 27 to the charge control unit 25 on the vehicle 200 side via the radio communication units 14, 24. When receiving this control signal, the charge control unit 25 turns off the relay unit 27 and disconnects the circuit including the battery 28 and the circuit including the receiving coil 22 and the rectifier 26 from each other.

In step S2, the power limiting unit 151 supplies a predetermined constant current Il to the transmitting coil 12 and excites the transmitting coil 12 with a low-level current.

In step S3, the power limiting unit 151 communicates with the charge control unit 25 on the vehicle 200 side via the radio communication units 14, 24 and obtains the receiving coil voltage Vs during the excitation in step S2.

In step S4, the power limiting unit 151 estimates a mutual reactance ωM. The receiving coil voltage Vs, i.e. an induced voltage of the receiving coil 22 satisfies the relationship of the following formula, and the power limiting unit 151 estimates the mutual reactance ωM based on this relationship formula.

[Math 3]

$$Vs = \omega M I_1 \quad (3)$$

In step S5, the power limiting unit 151 determines the magnitude relationship between the induced current Im and the receiving coil current Is. Specifically, the control unit 15 calculates the induced current Im and the receiving coil current Is based on the aforementioned formula 1 and the aforementioned formula 2, respectively, and compares the magnitudes of Im and Is. Then, when the induced current Im is greater than the receiving coil current Is, the power limiting unit 151 selects the control mode in which the power is limited in the situation where the battery voltage Vr is high. Meanwhile, when the receiving coil current Is is greater than (or equal to) the induced current Im, the power limiting unit 151 selects the control mode in which the power is limited in the situation where the battery voltage Vr is low.

Note that, upon completion of step S5, the power limiting unit 151 outputs a control signal of turning on the relay unit 27 to the charge control unit 25 on the vehicle 200 side via the radio communication units 14, 24.

Figure 6:
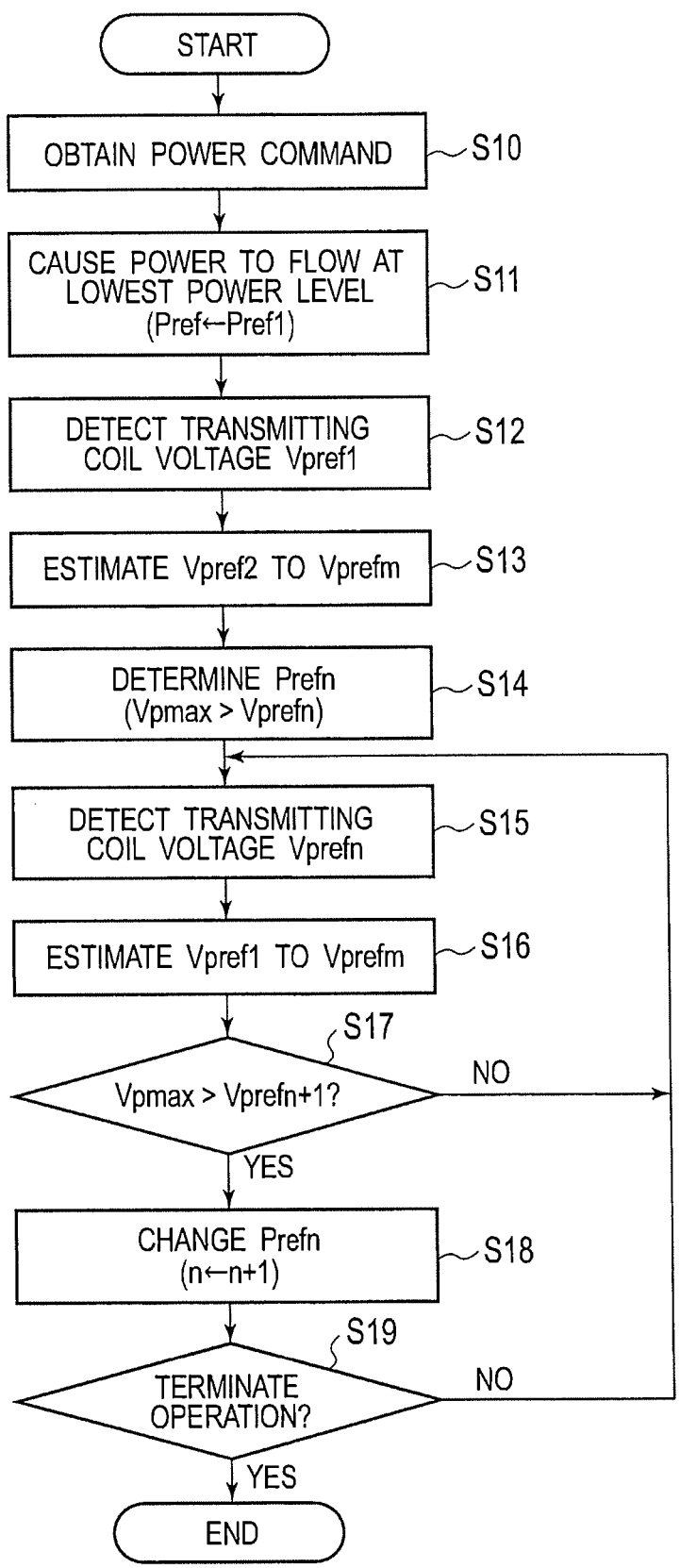
FIG. 6 is a flowchart illustrating control procedures in a control mode in which the power is limited in a situation where the battery voltage is low.
Figure 7:
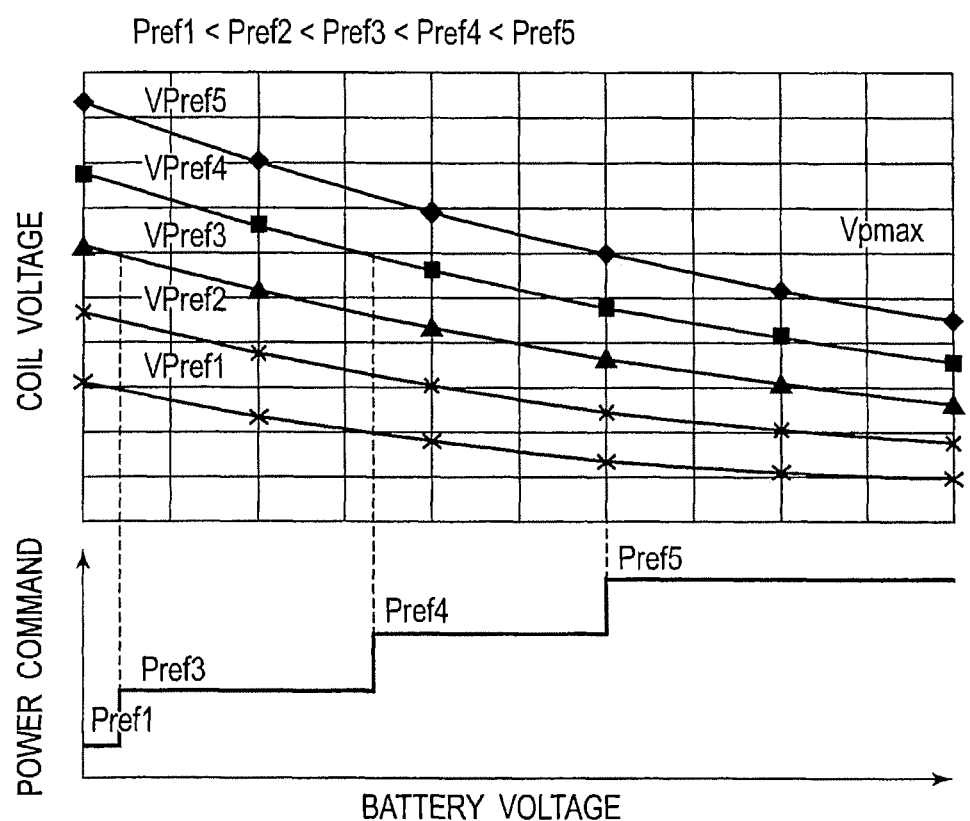
FIG. 7 is a schematic view illustrating a concept of determining a limited power command.

FIG. 6 is a flowchart illustrating control procedures in the control mode in which the power is limited in the situation where the battery voltage Vr is low. When the control mode in which the power is limited in the situation where the battery voltage Vr is low is selected in step S5 described above, the power limiting unit 151 determines the limited power command Pref as described below. FIG. 7 is a schematic view showing a concept of determining the limited power command Pref. A first power command Pref1 to an m-th power command Prefm (m is an arbitrary natural number) shown in FIG. 7 are values which are candidates for the limited power command Pref. The relationships among the power commands Pref1 to Prefm are such that the first power command Pref1 is the smallest, followed by the second power command Pref2, . . . , and the m-th power command Prefm is the greatest, and the magnitudes of the power commands Pref1 to Prefm are different from one another at predetermined intervals in a stepwise fashion. In the example illustrated in Fig, 7, the case of m=5 is given as an example.

First, in step S10, the power limiting unit 151 obtains the charge power command from the vehicle 200 side.

In step S11, the power limiting unit 151 sets the limited power command Pref to the first power command Pref1 which is the smallest power command, and outputs the thus-set limited power command Pref to the inverter control unit 152. In this case, a value specified in advance is used as the first power command Pref1. Then, the inverter control unit 152 controls the power to flow through the transmitting coil 12 based on the limited power command Pref (first power command Pref1).

In step S12, the power limiting unit 151 detects a first transmitting coil voltage Vpref1 corresponding to the first power command Pref1 with the voltage sensor 121.

In step S13, the power limiting unit 151 estimates a second transmitting coil voltage Vpref2 which is a voltage of the transmitting coil 12 at the time when the limited power command Pref is set to the second power command Pref2, based on the first transmitting coil voltage Vpref1 detected in step S12. Similarly, the power limiting unit 151 estimates a third transmitting coil voltage Vpref3 at the time when the limited power command Pref is set to the third power command Pref3, . . . , and an m-th transmitting coil voltage Vprefm corresponding to the m-th power command Prefm. The second transmitting coil voltage Vpref2 corresponding to the second power command Pref2 is set to a value which has a predetermined proportional relationship with the first transmitting coil voltage Vpref1 corresponding to the power command of a lower level (first power command Pref1), and is uniquely determined according to the first transmitting coil voltage Vpref1. The transmitting coil voltages Vpref3 to Vprefm corresponding to the remaining power commands Pref3 to Prefm are similarly set, and are uniquely determined according to the transmitting coil voltages Vpref2 to Vprefm−1 of lower levels.

In step S14, the power limiting unit 151 determines an n-th power command Prefn (n is a natural number from one to m) to be selected as the limited power command Pref. Specifically, the power limiting unit 151 determines one of the transmitting coil voltages Vpref1 to Vprefm which is the greatest within a range smaller than the coil upper limit voltage Vpmax, as an n-th transmitting coil voltage Vprefn. Then, the power limiting unit 151 sets the limited power command Pref to the n-th power command Prefn corresponding to the determined n-th transmitting coil voltage Vprefn, and outputs the thus-set limited power command Pref to the inverter control unit 152. Then, the inverter control unit 152 controls the power to be inputted into the transmitting coil 12 based on the limited power command Pref (n-th power command Prefn).

In step S15, the power limiting unit 151 detects the n-th transmitting coil voltage Vprefn corresponding the limited power command Pref (n-th power command Prefn) with the voltage sensor 121.

In step S16, the power limiting unit 151 estimates the first transmitting coil voltage Vpref1 to the fifth transmitting coil voltage Vpref5, based on the n-th transmitting coil voltage Vprefn detected in step S15. The method given as an example in step S13 can be used as the method for estimating the transmitting coil voltages Vpref1 to Vpref5.

In step S17, the power limiting unit 151 determines a (n+1)th transmitting coil voltage Vprefn+1 which is one of the first transmitting coil voltage Vpref1 to the fifth transmitting coil voltage Vpref5 estimated in step S16 and which is one level higher than the n-th transmitting coil voltage Vprefn detected in step S15. Then, the power limiting unit 151 determines whether the (n+1)th transmitting coil voltage Vprefn+1 is smaller than the coil upper limit voltage Vpmax. When the determination result is yes in step S17, the flow proceeds to step S18. Meanwhile, when the determination result is no in step S 17, the flow returns to step S15.

In step S18, the power limiting unit 151 sets the limited power command Pref to an (n+1)th power command which is one level higher than the n-th power command Prefn selected in step S14, and outputs the thus-set limited power command Pref to the inverter control unit 152. Then, the inverter control unit 152 controls the power to be inputted into the transmitting coil 12, based on the limited power command Pref ((n+1)th power command Prefn+1).

In step S19, the power limiting unit 151 determines whether to terminate the power supplying operation. When the determination result is yes in step S19, this routine is terminated. Meanwhile, when the determination result is no in step S19, the flow returns to the processing of step S15.

Figure 8:
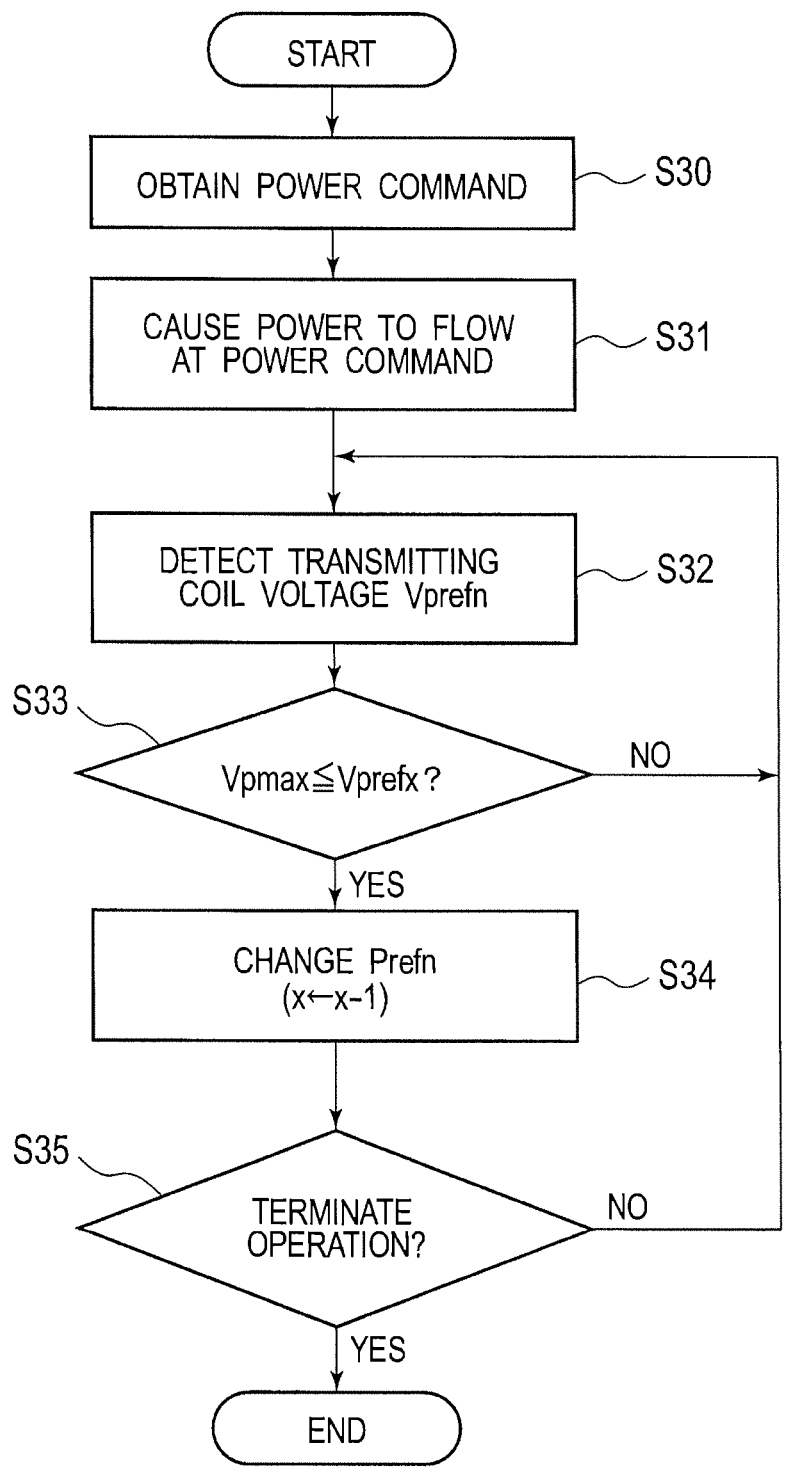
FIG. 8 is a flowchart illustrating control procedures in a control mode in which the power is limited in a situation where the battery voltage is high.
Figure 9:
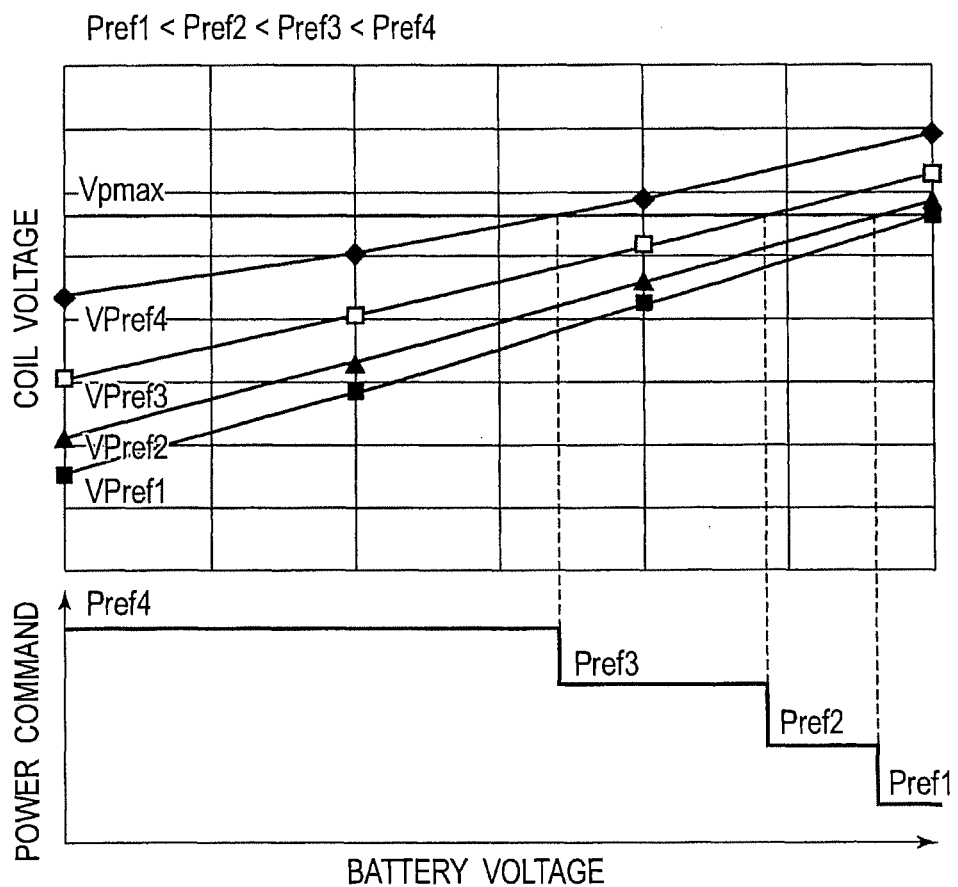
FIG. 9 is a schematic view illustrating a concept of determining the limited power command.

FIG. 8 is a flowchart illustrating control procedures in the control mode in which the power is limited in the situation where the battery voltage Vr is high. When the control mode in which the power is limited in the situation where the battery voltage Vr is high is selected in step S5 described above, the power limiting unit 151 determines the limited power command Pref as described below. FIG. 9 is a schematic view illustrating a concept of determining the limited power command Pref. A first power command Pref1 to a fourth power command Prefx (x is an arbitrary natural number) shown in FIG. 9 are values which are candidates for the limited power command Pref. The relationships among the power commands Pref1 to Prefx are such the first power command Pref1 is the smallest, followed by the second power command Pref2, . . . , and the x-th power command Prefx is the greatest, and the magnitudes of the power commands Pref1 to Prefx are different from one another at predetermined intervals in a stepwise fashion. In the example illustrated in FIG. 9, the case of x=4 is given as an example.

First, in step S30, the power limiting unit 151 obtains the charge power command from the vehicle 200 side.

In step S31, the power limiting unit 151 does not temporarily set the limited power command Pref, and the inverter control unit 152 controls the power to be inputted into the transmitting coil 12 based on the charge power command obtained from the vehicle 200 side.

In step S32, the power limiting unit 151 detects the current transmitting coil voltage Vp with the voltage sensor 121, and sets the thus-detected transmitting coil voltage Vp as the x-th transmitting coil voltage Vprefx.

In step S33, the power limiting unit 151 determines whether the x-th transmitting coil voltage Vprefx is equal to or greater than the coil upper limit voltage Vpmax. When the determination result is yes in step S33 (Vpmax≤Vprefx), the flow proceeds to step S34. Meanwhile, when the determination result is no in step S33 (Vpmax>Vprefx), the flow returns to step S32.

In step S34, the power limiting unit 151 sets the limited power command Pref to an (x−1)th power command Prefx−1 which is one level lower than the current x-th power command Prefx, and outputs the thus-set limited power command Pref to the inverter control unit 152. Then, the inverter control unit 152 controls the power to be inputted into the transmitting coil 12, based on the limited power command Pref ((x−1)th power command Prefx−1).

In step S35, the power limiting unit 151 determines whether to terminate the power supplying operation. When the determination result is yes in step S35, this routine is terminated. Meanwhile, when the determination result is no in step S35, the flow returns to the processing of step S32.

As described above, in the embodiment, the power limiting unit 151 of the power supplying device 100 including the transmitting coil 12 controls the power control unit 11 to perform the power limiting control of limiting the power flowing through the transmitting coil 12. In this case, the power limiting unit 151 determines the magnitude relationship between the induced current Im and the receiving coil current Is, based on the coil coupling condition between the transmitting coil 12 and the receiving coil 22, and selects a control mode to be employed for the power limiting control, based on the determination result.

In such a configuration, since the correlation between the battery voltage Vr and the transmitting coil voltage Vp differs depending on the coil coupling condition, an appropriate control mode can be selected by determining the magnitude relationship between the induced current Im and the receiving coil current Is based on the coil coupling condition. This enables appropriate power limiting and can suppress a situation where the transmitting coil voltage Vp exceeds the coil upper limit voltage Vpmax and a situation where the power is limited more than necessary. As a result, an efficient system can be built of small coils.

Moreover, in the embodiment, the power limiting unit 151 has the control mode in which the power is limited in the situation where the battery voltage Vr is low and the control mode in which the power is limited in the situation where the load voltage Vr is high. Furthermore, when the receiving coil current Is is greater than the induced current Im, the power limiting unit 151 selects the control mode in which the power is limited in the situation where the battery voltage Vr is low. Meanwhile, when the induced current Im is greater than the receiving coil current Is, the power limiting unit 151 selects the control mode in which the power is limited in the situation where the battery voltage Vr is high.

When the coupling condition is high, the battery voltage Vr and the transmitting coil voltage Vp have the negative correlation. Hence, the lower the battery voltage Vr is, the higher the transmitting coil voltage Vp is. In view of this, selecting the control mode in which the power is limited in the situation where the battery voltage Vr is low can suppress the situation where the transmitting coil voltage Vp exceeds the coil upper limit voltage Vpmax. Moreover, since the power can be controlled at an appropriate value, the situation where the power is limited more than necessary can be appropriately suppressed. Meanwhile when the coupling condition is low, the battery voltage Vr and the transmitting coil voltage Vp have the positive correlation. Hence, the higher the battery voltage Vr is, the higher the transmitting coil voltage Vp is. In view of this, selecting the control mode in which the power is limited in the situation where the battery voltage Vr is high can suppress the situation where the transmitting coil voltage Vp exceeds the coil upper limit voltage Vpmax. Moreover, since the power can be controlled at an appropriate value, the situation where the power is limited more than necessary can be appropriately suppressed.

In the embodiment, when the power limiting unit 151 selects the control mode in which the power is limited in the situation where the battery voltage is low, the power limiting unit 151 starts the flow of power to the transmitting coil 12 at the lowest power level and increases the limited power command based on the transmitting coil voltage Vp within such a range that the voltage of the transmitting coil 12 does not exceed the coil upper limit voltage Vpmax.

In such a configuration, it is possible to suppress the situation where the transmitting coil voltage Vp exceeds the coil upper limit voltage Vpmax. Moreover, since the power can be controlled at an appropriate value, the situation where the power is limited more than necessary can be appropriately suppressed.

Moreover, in the embodiment, when the power limiting unit 151 selects the control mode in which the power is limited in the situation where the battery voltage Vr is high, the power limiting unit 151 starts the flow of power to the transmitting coil 12 at the charge power instruction sent from the vehicle 200 side, and reduces the limited power command based on the transmitting coil voltage Vp within such a range that the voltage of the transmitting coil 12 does not exceed the coil upper limit voltage Vpmax.

In such a configuration, the situation where the transmitting coil voltage Vp exceeds the coil upper limit voltage Vpmax can be suppressed. Moreover, since the power can be controlled at an appropriate value, the situation where the power is limited more than necessary can be appropriately suppressed.

(Second Embodiment)

A contactless power supplying system in a second embodiment is described below. The second embodiment is different from the first embodiment in that a configuration without the voltage sensor 121 is achieved by estimating the transmitting coil voltage Vp. Note that description of configurations common with those in the first embodiment is omitted, and points different from the first embodiment are mainly described below.

The power limiting unit 151 uses the transmitting coil voltage Vp to determine the limited power command Pref. In the embodiment, the power limiting unit 151 estimates the transmitting coil voltage Vp without performing detection with a sensor or the like. Specifically, the power limiting unit 151 estimates the transmitting coil voltage Vp based on the following formulae.

[Math 4]
$$Ip=\sqrt{Is^2+Im^2} \quad (4)$$

[Math 5]
$$Vp \approx \omega L_1 Ip \quad (5)$$

In formula (5), $\omega L_1$ is an inductance of the transmitting coil and is set in advance through experiments and simulations.

As described above, in the embodiment, the power limiting unit 151 estimates the transmitting coil voltage Vp based on the battery voltage Vr, the power command, and the receiving coil voltage Vs.

In such a configuration, since the transmitting coil voltage Vp can be estimated, a sensor for detecting the voltage Vp can be omitted. This can achieve a simpler system configuration and cost reduction.

Note that, although the limited power command Pref is obtained by sequentially performing calculations in the aforementioned first embodiment and the second embodiment, the limited power command Pref can be determined also by means of map calculation.

FIG. 10 is an explanatory view schematically illustrating power command maps for determining the limited power command Pref with the battery voltage Vr and the transmitting coil voltages Vpref1 to Vpref5 being parameters. The power command map illustrated in part (a) of FIG. 10 shows an example of a map employed when the coil coupling condition is high, i.e. in the control mode in which the power is limited in the situation where the battery voltage Vr is low. The power limiting unit 151 has a plurality of such maps corresponding to a plurality of mutual inductances ωM. Moreover, the power command map illustrated in part (b) of FIG. 10 shows an example of a map employed when the coil coupling condition is low, i.e. in the control mode in which the power is limited in the situation where the battery voltage Vr is high. The power limiting unit 151 has a plurality of such maps corresponding to the plurality of mutual inductances ωM.

The power limiting unit 151 estimates the mutual reactance ωM and selects a control mode as described in the first embodiment. Then, the power limiting unit 151 determines the power command map corresponding to the selected control mode, according to the selected control mode. Furthermore, when the map is segmented according to the mutual reactance ωM, the power limiting unit 151 further determines the power command map, according to the mutual reactance ωM.

When determining the power command map, the power limiting unit 151 can determine the limited power command Pref according to the battery voltage Vr and the transmitting coil voltage Vp.

Using the power command maps as described above can decrease a direct calculation load of the power limiting unit 151. Moreover, since the power command can be changed linearly, the power efficiency can be improved.

The entire contents of Japanese Patent Application No. 2013-084549 (filed Apr. 15, 2013) are incorporated herein by reference.

Although the contents of the present invention have been described above by using the first and second embodiments, the present invention is not limited to the description of these embodiments. It is obvious to those skilled in the art that various changes and improvements can be made.

REFERENCE SIGNS LIST 100 power supplying device
11 power control unit
111 rectifier
112 PFC circuit
113 inverter
121 voltage sensor
12 transmitting coil
14 radio communication unit
15 control unit
151 power limiting unit
152 inverter control unit
200 vehicle
22 receiving coil
221 voltage sensor
24 radio communication unit
25 charge control unit
26 rectifier
27 relay unit
28 battery

The invention claimed is:

1. A contactless power supplying system comprising:
a transmitting coil configured to transmit power;
a power control unit configured to cause power from a power source to flow through the transmitting coil;
a receiving coil configured to receive the power transmitted from the transmitting coil by means of magnetic coupling;
a load to which power outputted from the receiving coil is inputted; and
a control unit configured to perform power limiting control of limiting the power flowing through the transmitting coil by controlling the power control unit, wherein
the control unit is further configured to select a control mode to be employed for the power limiting control based on a coil coupling condition between the transmitting coil and the receiving coil and a magnitude relationship between an induced current and a receiving coil current.

2. The contactless power supplying system according to claim 1, wherein
the control unit has a control mode in which the power is limited in a situation where a load voltage is low and a control mode in which the power is limited in a situation where the load voltage is high,
when the receiving coil current is greater than the induced current, the control unit selects the control mode in which the power is limited in a situation where a load voltage is low, and
when the induced current is greater than the receiving coil current, the control unit selects the control mode in which the power is limited in a situation where the load voltage is high.

3. The contactless power supplying system according to claim 2, wherein
when the control unit selects the control mode in which the power is limited in a situation where a load voltage is low, the control unit starts the flow of power to the transmitting coil at a lowest power level and increases a power command, based on a voltage of the transmitting coil, within such a range that the voltage of the transmitting coil does not exceed an upper limit voltage of the coil, the power command specifying the power to flow through the transmitting coil.

4. The contactless power supplying system according to claim 2, wherein
when the control unit selects the control mode in which the power is limited in a situation where the load voltage is high, the control unit starts the flow of power to the transmitting coil at a power command sent from the load side and reduces a power command specifying the power to flow through the transmitting coil, based on a voltage of the transmitting coil, within such a range that the voltage of the transmitting coil does not exceed an upper limit voltage of the coil.

5. The contactless power supplying system according to claim 3, wherein
the control unit estimates the voltage of the transmitting coil based on the load voltage, the power command, and a voltage of the receiving coil.

6. The contactless power supplying system according to claim 1, wherein the induced current flows through a mutual inductance that occurs between the transmitting coil and the receiving coil.

7. The contactless power supplying system according to claim 1, wherein the receiving coil current flows through the receiving coil.

* * * * *